United States Patent [19]

DiSalvo et al.

[11] 4,424,316

[45] Jan. 3, 1984

[54] COMPOSITIONS FOR FORMING POLY(OXAZOLIDONE/URETHANE) THERMOSETS AND PRODUCTS THEREFROM

[75] Inventors: Anthony L. DiSalvo, Greenwich, Conn.; Arthur J. Yu, Harvard, Mass.

[73] Assignee: Stauffer Chemical Company, Westport, Conn.

[21] Appl. No.: 309,732

[22] Filed: Oct. 8, 1981

[51] Int. Cl.$^3$ .................. C08G 18/58; C08G 18/34; C08G 18/80; C08G 59/42

[52] U.S. Cl. ........................ 525/528; 528/59; 528/73; 264/328.1

[58] Field of Search .............. 525/528; 528/73, 59; 264/328.1

[56] References Cited

U.S. PATENT DOCUMENTS

| | | | |
|---|---|---|---|
| 2,830,038 | 4/1958 | Pattison | 528/59 |
| 3,238,273 | 3/1966 | Hampson et al. | 521/167 |
| 3,242,108 | 3/1966 | McGary et al. | 260/2.5 |
| 3,313,747 | 4/1967 | Schramm | 260/2.5 |
| 3,373,221 | 3/1968 | May | 525/528 |
| 3,445,436 | 5/1969 | Lake et al. | 528/59 |
| 3,484,413 | 12/1969 | Kaufman | 528/59 |
| 3,639,655 | 2/1972 | Jones | 260/47 C |
| 3,761,452 | 9/1973 | Dawson | 528/59 |
| 3,781,235 | 12/1973 | Trott et al. | 521/128 |
| 3,847,874 | 11/1974 | Murakami et al. | 260/77.5 AN |
| 4,066,628 | 1/1978 | Ashida et al. | 528/73 |
| 4,070,416 | 1/1978 | Narahara et al. | 525/504 |
| 4,143,009 | 3/1979 | Dewey | 525/528 |
| 4,162,274 | 7/1979 | Rosenkrantz | 525/528 |
| 4,220,731 | 9/1980 | Zuppinger | 521/156 |
| 4,239,857 | 12/1980 | Harper | 521/121 |

FOREIGN PATENT DOCUMENTS 2247696 5/1974 Fed. Rep. of Germany .
2557408 6/1977 Fed. Rep. of Germany ...... 525/528

OTHER PUBLICATIONS

Lee, Article in Rubber Chemistry and Techn., vol. 53, Jul.-Aug. 1980, No. 3, pp. 542-599.

*Primary Examiner*—H. S. Cockeram
*Attorney, Agent, or Firm*—Richard P. Fennelly

[57] ABSTRACT

Reaction of a diepoxide with a mono-, or, preferably, dicarboxylic acid yields a prepolymer having both hydroxy and epoxy groups. This prepolymer, when reacted with a polyisocyanate, yields a poly(oxazolidone-/urethane) thermoset composition which is substantially free of isocyanurate linkages. The thermoset contains oxazolidone linkages in its backbone which are separated from one another by ester linkages. Urethane linkages are present in side chains attached to the polymer backbone of the thermoset.

15 Claims, No Drawings

COMPOSITIONS FOR FORMING POLY(OXAZOLIDONE/URETHANE) THERMOSETS AND PRODUCTS THEREFROM

BACKGROUND OF THE INVENTION

1. Field of the Invention

The present invention relates to compositions for the production of poly(oxazolidone/urethane) thermosets and to products prepared therefrom.

2. Description of the Prior Art

Thermoset compositions containing oxazolidone and urethane linkages have been described in the prior art.

U.S. Pat. No. 3,242,108 to C. W. McGary, Jr. et al. describes reaction of a monomeric polyepoxide, an organic polyisocyanate, and an organic compound containing an active hydrogen atom, e.g., a carboxylic acid, in the presence of a boron trifluoride-amine complex. This patent indicates that the epoxide reactant can be prereacted to form a prepolymer. The compositions resulting from such a reaction have been characterized as resulting in the simultaneous formation of isocyanurate, oxazolidone and urethane bonds (U.S. Pat. No. 4,220,731 to P. Zuppinger).

U.S. Pat. No. 3,313,747 to C. H. Schramm describes formation of isocyanate-oxazolidone derivatives by reacting a polyisocyanate with a diepoxide to yield a polyisocyanate-2-oxazolidone compound containing at least two 2-oxazolidone groups and two isocyanate groups. These compounds can be reacted with various polymerization or curing agents including polyols. Polymers resulting from reaction using a polyol curing agent would not contain ester linkages since a carboxylic acid reagent is not used in their synthesis.

The formation of polymers containing oxazolidone and urethane linkages by reaction of polyisocyanate with a prepolymer formed by a two step reaction involving (1) reaction of a dicarboxylic acid or anhydride (e.g., phthalic anhydride) and saturated dihydric alcohol followed by (2) reaction with a diepoxide is described in U.S. Pat. No. 3,847,874 to Y. Murakami et al. The reaction conditions described in this patent yield a prepolymer which contains a hydroxy group at one end and a terminal epoxide group with adjacent secondary, non-terminal hydroxy group at the other end. The diisocyanate will react with such a prepolymer to form a polymer having a recurring unit which contains urethane and oxazolidone linkages in its backbone and urethane side chains.

U.S. Pat. No. 4,066,628 to K. Ashida et al. illustrates preparation of a urethane-modified polyoxazolidone by reacting a diisocyanate and a diepoxide to form an isocyanate-terminated polyoxazolidone which is then reacted with a glycol. The resulting polymer composition contains both oxazolidone and urethane linkages in the same polymer chain or backbone of the recurring unit.

U.S. Pat. No. 4,220,731 to P. Zuppinger relates to formation of crosslinked polymers by reacting a liquid epoxide compound, a polyisocyanate and a polyhydroxy compound, including a polyester polyol, if desired. The recurring unit would contain oxazolidone and urethane linkages in the same polymer chain.

SUMMARY OF THE PRESENT INVENTION

The present invention relates to reaction mixtures comprising a polyisocyanate and an epoxy and hydroxy-group containing prepolymer formed by reaction of a diepoxy compound with a mono- or, preferably, dicarboxylic acid. The prepolymer has an equal number of epoxy and hydroxy groups, the hydroxy group or groups being secondary and in a non-terminal position. Reaction of the polyisocyante with such a prepolymer yields a poly(oxazolidone/urethane) thermoset which is substantially free of isocyanurate linkages. The oxazolidone rings form in the polymer backbone of the recurring unit in the polymer composition due to reaction of the terminal epoxy groups with isocyanate groups, said oxazolidone groups being separated from one another by ester linkages which are derived from the acid reactant used to make the prepolymer. When a diacid is used to form the prepolymer which is reacted with the polyisocyanate, urethane groups are formed in side chains to the polymer backbone in the recurring unit due to reaction of the secondary, non-terminal hydroxy groups with the isocyanate.

DETAILED DESCRIPTION OF PREFERRED EMBODIMENTS

The reaction mixture which is the subject matter of the present invention comprises a polyisocyanate and a prepolymer containing equal numbers of terminal epoxy groups and secondary, non-terminal hydroxy groups. Reaction of the polyisocyanate with the epoxy group of the prepolymer forms oxazolidone groups; reaction with the non-terminal, secondary hydroxy groups, urethane side chains in the recurring unit.

Any polyisocyanate capable of reaction with the epoxy and hydroxy groups contained in the prepolymer to form the desired oxazolidone and urethane linkages is contemplated for use by the present invention. Representative examples of suitable conventional polyisocyanates, which are used to form urethane polymers, for example, include such aromatic and aliphatic types as: the tolylene diisocyanates, such as 2,4-tolylene diisocyanate and 2,6-tolylene diisocyanate; the methylene bis(phenyl isocyanates), such as methylene bis (4-phenyl isocyanate); dianisidine diisocyanate, toluidine diisocyanate, m-xylene diisocyanate, 1,5-naphthylene diisocyanate, p-phenylene diisocyanate, and hexamethylene diisocyanate and other di- and higher polyisocyanates. Mixtures of such isocyanates can be used, if desired.

The prepolymer which forms the other major reaction ingredient has the formula

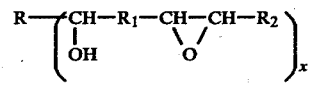

where R, $R_1$ and $R_2$ are independently any grouping of atoms to which a carbon atom can be covalently linked including, substituted or unsubstituted alkylene, arylene, alkylene-arylene and (for R) hydrogen and x is a positive integer of either 1 or 2. These prepolymers are formed by reacting a diepoxide with either a monocarboxylic acid or, preferably, a dicarboxylic acid, under conditions such that the prepolymer contains equal molar amounts of reactable epoxy groups and reactable secondary non-terminal hydroxy groups.

When monocarboxylic acids are used, it is preferred to add the acid to a slight excess of the diepoxide so as to favor the reaction in which one side of the diepoxide reacts thereby generating a secondary non-terminal —OH group at that end while leaving the terminal epoxide group at the other end unreacted:

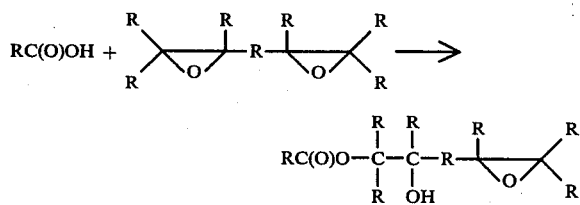

In the above formula R can be any of the groups described above for R, $R_1$ or $R_2$.

Reaction of monocarboxylic acids will generally result in a statistical mixture of desired prepolymer, fully reacted epoxide reagent containing no terminal epoxy groups, and unreacted diepoxide. It should be appreciated that the prepolymer resulting from the reaction of a monoacid and the diepoxide has one terminal epoxy group and one secondary hydroxy group. The end of the prepolymer remote from the terminal epoxy group is capped with an ester linkage. Reaction of a diisocyanate, for example, with such a prepolymer produces oxazolidone and urethane linkages in the same chain of the recurring unit, i.e., the polymer backbone, with the ester groups being in pendant side chains.

Reaction of diacids with the diepoxides is favored and is preferably carried out using slightly more than two moles of diepoxide to diacid. In this manner all the acid is reacted and a prepolymer is formed by reacting the terminal epoxy group of one epoxide reactant with one end of the diacid and the terminal epoxy group of another epoxide reactant with the other end of the diacid:

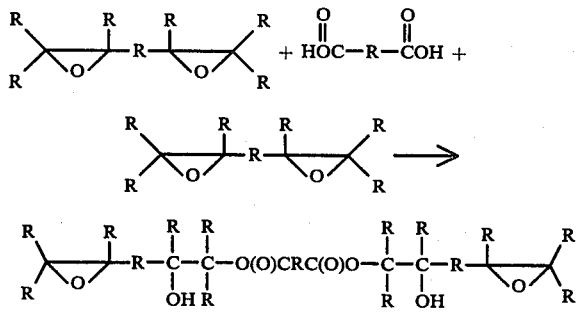

When a diisocyanate, for example, is reacted with the prepolymer from a diacid and diepoxide, the fact that the prepolymer is capped at both ends by epoxy groups forces formation of oxazolidone linkages in the polymer backbone of the recurring unit only. The presence of the non-terminal, secondary hydroxy groups, forces urethane formation in pendant side chains of the recurring unit.

In both of the cases given above, the prepolymer that results, is preferably, substantially acid free and has one or two terminal epoxy groups, each with an associated, non-terminal secondary hydroxy group.

The diepoxide and acid reactants that can be used to form the prepolymers described above can be selected from a wide variety of compounds as long as the above type of reaction occurs.

The type of diepoxides shown in U.S. Pat. No. 4,066,628 to K. Ashida et al., which is incorporated herein by reference, can be employed for use in connection with the present invention. Such diepoxides include the diglycidyl ethers of dihydric mononuclear and fused ring phenols, the diglycidyl ethers of non-fused polynuclear phenols having an alkylene, sulfone, carboxy, oxygen or sulfur bridging group between the phenol rings, the diglycidyl ethers of novolac resins, dicyclopentadiene dioxide, vinyl cyclohexane dioxide, the dicyclohexyl oxide carboxylates, and the diglycidyl derivatives of aromatic primary amines. Some representative diepoxides include the diglycidyl ethers of bisphenol A, hydroquinone, resorcinal, catechol, methylhydroquinone, 1,6-hexanediol, and 1,12-dodecanediol; alicyclic diepoxides, such as vinylcyclohexene dioxide, and dicyclopentadiene dioxide.

The acids that can be used include the saturated and unsaturated mono-and dicarboxylic acids. Representative acids include: acetic acid, benzoic acid, phthalic acid, isophthalic acid, terephthalic acid, adipic acid, oxalic acid, succinic acid, acrylic acid, methacrylic acid, α-phenylacrylic acid, α-chloroacrylic acid, α-chloroacetic acid, etc.

Once the prepolymer has been formed it is combined with the desired polyisocyanate to form a reaction mixture from which the poly(oxazolidone/urethane) thermoset compositions can be formed, including those of the present invention which depend upon use of a diacid reactant to form the prepolymer. If desired, the reaction medium can contain up to about 60%, by weight, of other materials which do not interfere with the reaction of the prepolymer and polyisocyanate. Representative ingredients include additional diepoxide (which can function as a solvent, if liquid), diol, acrylate or methacrylate ester monomer or polymer to impart flexibility to the final product. If desired, the reaction mixture can contain up to 10%, by weight, of one or more of the following additives: blowing agents, flame retardants, mold releasing agents, dyes, and stabilizers.

The amount of polyisocyanate chosen for reaction with the prepolymer should be substantially equivalent in regard to its isocyanate functionality (on an equivalent basis) to the total equivalents of epoxide and hydroxy groups in the composition from the prepolymer and any added ingredients which would react with the isocyanate. A slight excess of isocyanate (up to about 5% on a weight basis) can be tolerated but greater amounts should be avoided since the formation of isocyananurate linkages would be favored. In general, the respective molar amount of oxazolidone and urethane linkages to one another in the thermoset will depend upon the presence of other isocyanate reactive groups added to the reaction mixture. If only prepolymer and polyisocyanate are used a 50:50 (oxazolidone-:urethane) molar ratio polymer is produced. Addition of additional hydroxy group compounds, e.g., polyol, will yield a larger molar amount of urethane, whereas addition of epoxide materials, e.g., diepoxides, will increase the oxazolidone content of the product. The molar amount of oxazolidone to urethane can range from 90:10 of 4:96.

In order to favor formation of oxazolidone and urethane linkages in the thermoset composition, the reaction mixture of polyisocyanate and prepolymer can also contain a catalytically effective amount (e.g., from about 0.002% to about 2%, based on the weight of all reaction ingredients of an oxazolidone and/or urethane formation catalyst. Representative catalysts tending to favor oxazolidone formation include the quarternary ammonium salts (e.g., tetramethyl ammonium chloride); the metal alkoxides (e.g., lithium n-butoxide); the metal halides and their complexes (e.g., lithium chloride/hexamethylphosphoramide complex); and the organometallic compounds (e.g. trialkyl aluminum). Catalysts which favor urethane formation include the organotin compounds, diamines, and polyamines.

The resulting thermoset composition formed from the above-described reaction mixture is one which contains oxazolidone and urethane linkages and which is essentially free of substantial amounts of isocyanurate linkages. The oxazolidone linkages are in the polymer backbone of the main recurring unit in virtue of their formation by reaction of the polyisocyanate with a terminal epoxy group in the prepolymer. The urethane groups are in side chains in the main recurring unit of the polymer, rather than in the backbone of the recurring unit which contains the oxazolidone linkages, when a diacid is used to form the prepolymer described herein, in view of their formation by reaction of the polyisocyanate with the pendant, non-terminal hydroxy groups in such a prepolymer. Ester groups also lie in the polymer backbone of the unit and separate the oxazolidone groups. These ester groups are derived by reason of the reaction of a carboxylic acid with a diepoxide in forming the prepolymer.

The main recurring unit in the thermoset compositions of the present invention, which are derived from the reaction of the prepolymer and the polyisocyanate, has the formula reproduced below which is bounded by dotted lines:

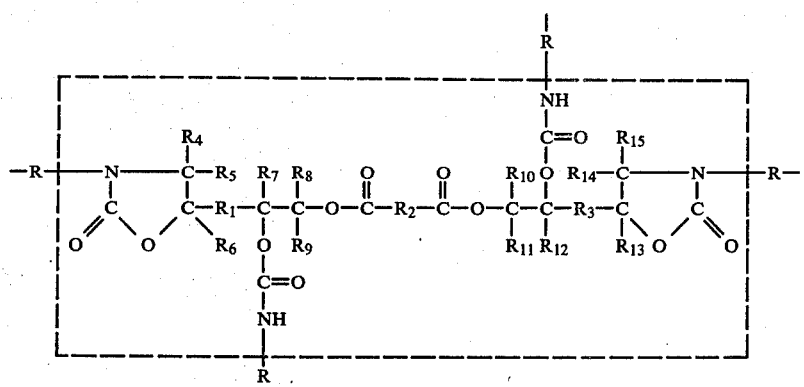

R, $R_1$, $R_2$ and $R_3$ in the above formula can be any of the groups described earlier for R, $R_1$ and $R_2$ in the prepolymer and can be such groups as alkylene, arylene, and alkylene-arylene groups. Any grouping of atoms to which a carbon atom can be covalently linked can be selected for R–$R_3$. $R_4$–$R_{15}$ are the same as R–$R_3$ and also include hydrogen in those cases in which an unsubstituted diepoxide is used.

The thermoset compositions of the present invention are useful in the fabrication of molded articles of manufacture, for example, by reaction injection molding techniques. If desired, the thermoset compositions can be combined with compatible reinforcing agents including glass fiber or flakes, graphite, wollastonite, mica, KEVLAR aromatic polyamide fiber, nylon fiber, and coupling agents.

EXAMPLE 1

This Example illustrates the reaction of adipic acid and the diglycidyl ether of bisphenol A to form a prepolymer reactant for use in the present invention.

A mixture of 248.8 gm. (0.67 mole) of the diglycidyl ether of bisphenol A, available as EPON 828 brand from Shell Chemical Co., 48.5 gm. (0.33 mole) of adipic acid, and 1.8 gm. of methyltrialkyl ($C_8$–$C_{10}$) ammonium chloride catalyst, available as ADOGEN 464 brand from Sherex Chemical Company, was heated at 100° C. over a period of about 5 hours until the acid number was 1.0±0.5. The product had an epoxy equivalent of 465.

EXAMPLE 2

This Example illustrates the formation of a poly(urethane/oxazolidone) composition from the prepolymer of Example 1.

A 500 ml. flask was charged with 103.3 gm. of a polyol having a hydroxyl number of 378, followed by 20.9 gm. of the finely ground prepolymer from Example 1. The polyol composition comprised about 70%, by weight, of a 5:1 mixture of polypropylene glycol with a polyethylene glycol/ethylene glycol mixture, about 20%, by weight, of polyacrylonitrile and about 10%, by weight, of N-phenyldiethanolamine. Stirring was commenced while the mixtures was heated. The temperature rose to about 60° C. in about 45 minutes, and complete solvation was achieved. The mixture was then allowed to cool, with stirring, to about 48° C. at which time the catalysts were added: 1.0 gm. of 0.1%, by weight, solution of dibuyltin dilaurate in the above-described polyol; and 0.16 gm. of the ADOGEN 464 catalyst used in Example 1. Mixing was then contiunued under vacuum for about 15 min. and 112 gm. of methylene bis(4-phenyl-isocyanate) (ISONATE 191 brand from Upjohn Chemical Co.) was added. Stirring was maintained until the temperature reached 77° C. The resulting material was then poured between two glass plates held at 100° C. overnight.

The polymer composition was calculated to contain about 5.7 mole % oxazolidone with the remainder urethane.

EXAMPLE 3

This Example utilizes the same general procedure shown in Example 2 for the formation of a poly(urethane/oxazolidone) composition with the following reaction ingredients:

| Ingredient | Amount |
| --- | --- |
| Methylene bis(4-phenylisocyanate) | 112 gm. |
| Polyol from Example 2 | 85.4 gm. |
| Prepolymer from Example 1 | 41.85 gm. |
| Dibutyltin dilaurate solution from Example 1 | 0.899 gm. |
| Ammonium chloride catalyst | 0.33 gm. |

The mixture from the reaction was at 72° C. when poured between two glass plates. An excellent plaque was formed and it released well.

The polymer was calculated to contain about 11.5 mole % oxazolidone with the remainder urethane.

EXAMPLE 4

This Example illustrates another synthesis of a poly(urethane/oxazolidone) composition.

The prepolymer from Example 1 (86.4 gm.) was mixed with 63.2 gm. of the polyol from Example 2 and heated to 70° C. with constant mixing. When complete solvation was achieved, the mixture was allowed to cool to about 32° C. Methylene bis(4-phenyl isocyanate) was added, without any catalyst, with rapid stirring under vacuum. The mixture, after about 15 minutes, began to react. At 51° C., the mixture was poured between two glass plates. The casting was of excellent appearance and released well from between the plates. The plaque was then cured at 100° C. overnight.

The polymer was calculated as containing about 22.9 mole % oxazolidone with the remainder urethane.

(COMPARATIVE) EXAMPLE 5

This Example shows the synthesis of a polyurethane composition, which is not part of the present invention for testing a comparative composition against the compositions of the present invention.

The following ingredients where mixed and reacted:

| Ingredient | Amount |
| --- | --- |
| Methylene bis(4-phenylisocyanate) | 112 gm. |
| Polyol from Example 2 | 116 gm. |
| Dibutyltin dilaurate solution from Example 2 | 1.16 gm. |

The reaction mixture exothermed to 75° C. and was poured between two glass plates. The resulting plaque released well and was cured overnight at 100° C.

EXAMPLE 6

This Example illustrates the synthesis of a prepolymer for use in the present invention by reacting the diglycidyl ether of bisphenol A and isophthalic acid.

The following reactants were utilized:

| Reactant | Amount |
| --- | --- |
| Diglycidyl ether of Bisphenol A (EPON 828 brand) | 597.12 gm. |
| Isophthalic acid | 132.7 gm. |
| ADOGEN 464 brand catalyst | 2.91 gm. |

All reactants were mixed and heated at 100° C. for about 7 hours. The reaction mixture was then poured into chloroform (about 1.66 liters). When all of the prepolymer dissolved, suspended solids were removed by filtration. The product, after evaporation of the chloroform, had an epoxy equivalent of 444.

EXAMPLE 7

This Example illustrates preparation of a poly(oxazolidone/urethane) composition in accordance with the present invention.

The brittle condensate from Example 6 (19.98 gm.) was ground in a blender to a size of about 840 microns and was mixed with 103.7 gm. of the polyol from Example 2. This mixture was stirred over one hour during which heating at 60° C. was applied. On cooling (33° C.), the catalysts were added: 1.0 gm. of the dibutyltin dilaurate solution from Example 2 and 0.16 gm. of ADOGEN 464 catalyst. Stirring was maintained and vacuum was applied. When the mixture became homogeneous, methylene bis(4-phenylisocyanate) was added. Vacuum was maintained, and stirring was continued. When the exothermic reaction that resulted reached 73° C., the mixture was poured between two glass plates held at 100° C. and was heated overnight (17 hours). The casting was then removed.

The polymer was calculated as containing about 5.7 mole % oxazolidone with the remainder polyurethane.

EXAMPLE 8

The prepolymer (39.9 gm.) from Example 6 was ground and stirred into 90.7 gm. of the polyol used in Example 2. Heating was applied, and the temperature of the reaction reached about 65° C. Complete solvation was achieved by stirring for about 45 min. Vacuum was applied for degassing. When the temperature fell to 33° C., the catalysts were added (0.9 gm. of the dibutyltin dilaurate solution from Example 2 and 0.31 gm. of ADOGEN 464 catalyst), and stirring was continued for about 0.5 hours. At 33° C., 112 gm of methylene bis-(4-phenylisocyanate) was added, and vacuum and stirring was maintained. When the mixture exothermed to 72° C., it was poured between two glass plates held at about 100° C. and cured at 100° C. overnight (17 hrs.). The plaque thus formed released well.

The polymer was calculated as containing about 11.5 mole % oxazolidone with the remainder urethane.

EXAMPLE 9

The prepolymer composition (79.92 gm.) from Example 6 was ground and added to 64.7 gm. of the polyol of Example 2. The mixture was heated to 55° C. so as to dissolve the prepolymer. It was allowed to cool and vacuum was applied, with stirring, for 45 minutes. At a temperature of 33° C., 112 gm. of methylene (4-phenylisocyanate) was added (without added catalyst) and the mixture was stirred in vacuo. The mixture was allowed to exhibit exothermicity to 50° C. at which point it was poured between two glass plates held at 100° C. The casting was released when solid (after about 42 hours) and was then cured at 100° C. overnight.

The polymer was calculated as containing 22.9% oxazolidone with the remainder urethane.

EXAMPLE 10

This Example illustrates the respective physical properties of the poly(oxazolidone/urethane) compositions of the present invention (Examples 2–4 and 7–9) as compared to a conventional polyurethane compositions (Example 5). The polymers of Examples 2–4 were formed from a prepolymer formed by reaction of adipic acid and the diglycidyl ether of bisphenol A (as described in Example 1); Example 7-9, from a prepolymer formed by reacting isophthalic acid and the diglycidyl ether of bisphenol A (Example 6).

gm. of 2,2'-azobis(2,4-dimethylvaleronitrile catalyst (VAZO 52 brand) were then added, and the mixture was stirred with attempts made to degas it. The mixture was then poured into a PETRI dish and was heated at

| Example No. | Tensile Strength (kg./cm.$^2$) | | Elongation (%) | | Elast. Modulus (kg./cm.$^2$ × 10$^3$) | Aver. Tensile Impact (J/cm.$^2$) | Izod Impact (J/cm.) | Tan Modulus of Elasticity (kg./cm.$^2$ × 10$^3$) |
|---|---|---|---|---|---|---|---|---|
| | Yield | Break | Yield | Break | | | | |
| 2 | 424.25 | 444.50 | 13.5 | 80 | 5.062 | 15.72 | 1.23 | 14.55 |
| 3 | 547.29 | 491.89 | 15.5 | 40 | 6.046 | 7.94 | 0.75 | 17.72 |
| 4 | 680.88 | 678.84 | 19.9 | 48 | 7.382 | 4.33 | 0.43 | 23.91 |
| 5A* | — | 380.52 | — | 128 | 4.640 | 27.46 | 2.08 | 9.91 |
| 5B* | — | 394.51 | — | 150 | 3.797 | 42.52 | 2.30 | 9.07 |
| 7 | 414.06 | 417.50 | 13.1 | 86 | 4.992 | 9.64 | 1.55 | 13.92 |
| 8 | 505.88 | 576.82 | 16.6 | 42 | 5.414 | 8.24 | 0.91 | 17.58 |
| 9 | 695.79 | 717.16 | 19.2 | 30 | 6.750 | 6.18 | 0.48 | 23.13 |

*conventional polyurethane presented for comparative purposes. Two runs were used (A and B) and both sets of data are depicted.

EXAMPLE 11

This Example illustrates the formation of a prepolymer by reacting acrylic acid and the diglycidyl ester of bisphenol A followed by reaction of the prepolymer with a diisocyanate to form a poly(urethane/oxazolidone) composition.

The following ingredients were stirred and heated to 100° C.:

| Ingredient | Amount |
|---|---|
| Diglycidyl ether of bisphenol A (EPON 828 brand) | 204.6 gm. (0.6 mole) |
| ADOGEN 464 catalyst | 1.08 gm. |
| Butylated hydroxytoluene | 0.495 gm. |

Glacial acrylic acid (43.2 gm., 0.6 mole) was then added over a period of about 1.5 hours. Heating and stirring was continued for an additional 1.5 hours after the addition of acrylic acid had been completed. The mixture was cooled and allowed to remain overnight. The resulting prepolymer mixture had an acid number of 12.66 and an epoxide equivalent of 358.

The prepolymer mixture prepared above was then reacted with methylene bis(4-phenylisocyanate). To accomplish this reaction, 30.0 gm. of the prepolymer composition was mixed with 0.25 gm. of ADOGEN 464 catalyst and degased with stirring for about one hour. To this mixture was then added 20.7 gm. of methylene bis (4-phenylisocyanate) to which 0.05 gm. of azobisisobutyronitrile catalyst (VAZO 52 brand) had been added. The mixture was mixed under vacuum for about 35 minutes, poured on a glass sheet, and heated at 100° C. After 10 minutes the mixture hardened with the formation of bubbles. Heating was continued for a total of 7 hours. The resulting product was brittle, much like glass, and was not tough.

EXAMPLE 12

This Example shows formation of a poly(urethane/oxazolidone) composition by reaction of the prepolymer of Example 11, butyl acrylate, and a diisocyanate.

The prepolymer from Example 11 (30.0 gm., epoxide equivalent 358) and 0.25 gm. of ADOGEN 464 brand catalyst were degassed and mixed for about 20 minutes. At this point 9.54 gm. (0.0745 mole) of n-butyl acrylate was added. Degassing could not be performed due to the high level of monomer volatiles. Methylene bis (4-phenyl-isocyanate), 20.7 gm. or 0.0746 mole, and 0.6 gm. of 2,2'-azobis(2,4-dimethylvaleronitrile catalyst (VAZO 52 brand) were then added, and the mixture was stirred with attempts made to degas it. The mixture was then poured into a PETRI dish and was heated at 100° C. for about three hours. The resulting cured disk showed many bubbles and stress cracks.

EXAMPLE 13

This Example illustrates formation of a poly(urethane/oxazolidone) composition from the prepolymer of Example 11, butyl acrylate, and diisocyanate.

The following ingredients were added to a 4-neck flask:

| Ingredient | Amount |
|---|---|
| Prepolymer from Example 11 | 60 gm. (epoxy equiv. 358) |
| N—butyl acrylate | 19.08 gm. (0.15 mole) |
| Diglycidyl ether of bisphenol A (EPON 828 brand) | 55.0 gm. (0.15 mole) |
| ADOGEN 464 brand catalyst | 0.86 gm. |
| Azoisobutyronitrile catalyst (VAZO 64 brand) | 0.5 gm. |

The resulting mixture was stirred and heated at 67° C. for 75 min. when the temperature was raised to 90° C. for 45 min. The mixture was then cooled to 45° C. and 81.0 gm. (0.29 mole) of methlene bis (4-phenylisocyanate) was added. Stirring of the mixture was continued, and the temperature began to rise quickly. The mixture cured within the reactor. The resulting polymer was removed and cured at 100° C. overnight.

EXAMPLE 14

This Example is similar to the preceding one with the exception that hydroxyethylmethacrylate is used as a reaction ingredient rather than butyl acrylate.

The prepolymer from Example 11 (60 gm., epoxide equivalent 358), hydroxyethylmethacrylate (18.9 gm., 0.15 mole) and 0.08 gm. of azobisisobutyronitrile catalyst (VAZO 64 brand) were mixed. The mixture was degassed, blanketed with nitrogen and heated to 62° C. After 3½ hours the viscosity of the reaction mixture increased 600%. At this point 55 gm. (0.15 mole) of the diglycidyl ether of bisphenol A (EPON 828) and 0.6 gm. of ADOGEN 464 brand catalyst were added. The mixture was not heated but was stirred and degassed for about 30 minutes. Then 121 gm. (0.44 mole) of methylene bis(4-phenylisocyanate) followed by stirring and degassed. The initial temperature of the mixture was 32° C. and was allowed to rise to 50° C. The mixture was then poured between two glass plates that had been preheated at 90° C. The plates and reaction mixture were heated at 90° C. overnight. The brittle, glasslike composition released well from between the plates.

EXAMPLE 15

This Example illustrates formation of poly(urethane/oxazolidone) compositions by reaction of the prepolymer of Example 11, butyl acrylate polymer, the diglycidyl ether of bisphenol A, butyl acrylate monomer, and diisocyanate.

The homopolymerization of n-butyl acrylate (39.2 gm.) was carried out by first purging the acrylate monomer with nitrogen for 10 minutes followed by addition of 0.02 gm. of azobisisobutyronitrile catalyst (VAZO 64 brand). After 1½ hours an additional 0.02 gm. of catalyst was added, and the reaction commenced. In about 10 minutes a sticky solid mass of polybutyl acrylate was produced.

The polybutyl acrylate (about 30 gm.) was stirred in vacuo with 60 gm. of the prepolymer from Example 11 and 55 gm. of the diglycidyl ether of bisphenol A. To the resulting mixture was charged 5 gm. of butyl acrylate, 0.86 gm. of ADOGEN 464 catalyst, 0.01 gm. of VAZO 64 catalyst, and 81 gm. of degased methylene bis(4-phenylisocyanate). This mixture was stirred and the temperature rose to 47° C. from 42° C. Mixing was difficult and vacuum was applied occasionally. The mixture was then poured between two glass plates preheated to 100° C., and the plates and reaction mixture were placed in an oven at 90° C. overnight. The molded plaque was hard and released well from between the plates. The plaque was brittle but did not appear as brittle as the plaque formed in Example 14.

EXAMPLE 16

This Example illustrates formation of a prepolymer by reaction acetic acid and the diglycidyl ether of bisphenol A and its subsequent reaction with a diisocyanate.

A mixture of diglycidyl ether of bisphenol A (EPON 828 brand), 559.8 gm. or 1.5 moles) and ADOGEN 464 brand catalyst (2.4 gm.) was brought to 100° C. at which time 90.0 gm. (1.5 moles) of glacial acetic acid was added over a period of 1.5 hours. Heating was maintained at 100° C. for about 4.75 hours. The prepolymer mixture had an acid number of 17, due to the presence of unreacted acid, and an epoxy equivalent of 401. It comprised 50% monoacetate, 25% diacetate, and 25% unreacted depoxide.

The prepolymer mixture thus produced (238 gm.) and 1.8 gm. of ADOGEN 464 catalyst were mixed and pumped for about one hour. To the resulting mixture was then added 138.7 gm. (0.5 mole) of methylene bis (4-phenylisocyanate). Mixing was continued in vacuo until the temperature reached 28° C. Mixing was difficult, however, in about 10 minutes the solution became homogenous. The temperature of the solution rose to 50° C. when it was poured between heated glass plates at about 100° C. A solid cured plaque was not obtained although chunks of solid product were isolated. These chunks were cured at 100° C. overnight, and produced somewhat brittle compositions.

EXAMPLE 17

This Example is similar to the preceding Example.

The prepolymer formed in Example 16 (80.16 gm., epoxide equivalent: 401), the diglycidyl ether of bisphenol A (74.64 gm., 0.2 mole) and 1.3 gm. of ADOGEN 464 catalyst were stirred in vacuo for about 45 minutes. The vacuum was broken and 110.96 gm. (0.4 mole) of methylene bis (phenylisocyanate) was added. The mixture was stirred in vacuo until the temperature rose to about 30° C. from 23° C. The mixture was poured between two plates sprayed with a release agent. These plates were heated to 100° C. overnight, and the mixture between them solidified. It contained bubbles and did not release from the plates. The product was judged to be as brittle as the product from Example 16.

EXAMPLE 18

This Example is similar to the preceding Example with the major exception that a polyol was also present as a reactant.

The prepolymer from Example 16 (72.1 gm., epoxide equivalent: 401), the polyol from Example 2 having a hydroxyl number of 378 (63.2 gm., 0.46 mole), and 0.88 gm. of ADOGEN 464 catalyst were mixed in vacuo for about 45 minutes. The methylene bis(4-phenylisocyanate), 109.0 gm. or 0.393 mole, was then added, and stirring and application of vacuum was resumed. The reaction temperature rose to 50° C. when the mixture was poured between two glass plates preheated at 100° C. The plates containing the product was heated at 100° C. overnight. The cured product released from the plates and contained bubbles. It was brittle and tougher than the product from Example 17.

EXAMPLE 19

This Example illustrates formation of thermoset compositions using the prepolymer mixture of Example 16 to prepare a composition containing 23 mole % oxazolidone.

The prepolymer mixture of Example 16 (79.6 gm., epoxide equivalent 442), 162.5 gm. of the polyol from Example 2, 0.67 gm. of ADOGEN 464 catalyst, and 9.9 gm. of 0.1%, by weight, solution of dibutyltin dilaurate in the polyol from Example 2 were mixed in vacuo for about 30 min. To this mixture was added 112 gm. of ISONATE 191 diisocyanate with mixing in vacuo. When the mixture exothermed to 55° C. it was poured between two glass plates held at 100° C. and was cured at 100° C. for 17 hours.

The physical properties of this material are given in Example 22.

EXAMPLE 20

This Example is similar in general procedure to the preceding Example.

The prepolymer mixture of Example 16 (39.8 gm.), 89.5 gm. of the polyol from Example 2, 0.6 gm. of ADOGEN 464 catalyst, and 1.03 gm. of a 0.1% solution of dibutyltin dilaurate catalyst in the polyol from Example 2 were mixed in vacuo for about 30 minutes followed by addition of 112 gm. of ISONATE 191 diisocyanate. The mixture was pumped and allowed to exotherm to 62° C. At this temperature, the mixture was poured between two glass plates held at 100° C. and the mixture was cured at 100° C. for 17 hours.

The physical properties of this material are given in Example 22.

EXAMPLE 21

This Example is similar to the preceding Example. To prepare a composition containing 6 mole % oxazolidone, the prepolymer mixture of Example 16 (19.9 gm.), 103 gm. of the polyol from Example 2, 0.6 gm. of ADOGEN 464 catalyst, and 1.09 gm. of a 0.1% solution of dibutyltin dilaurate catalyst in the polyol from Example 2 were mixed in vacuo for about 30 minutes followed by addition of 112 gm. of ISONATE 191 diisocyanate. The mixture was pumped and allowed to exotherm to 72° C. At this temperature, the mixture was poured between two glass plates held at 100° C., and the mixture was cured at 100° C. for 17 hours.

The physical properties of this material are given in Example 22.

EXAMPLE 22

The physical properties noted for the thermoset products of Examples 19-21 as follows:

| Example | Tensile Str. (kg/cm$^2$) Yield | Tensile Str. (kg/cm$^2$) Break | Elongation (%) Yield | Elongation (%) Break | Elastic Modulus (kg/cm$^2$ × 10$^3$) | Tensile Impact (J/cm$^2$) | Izod Impact (J/cm) | Tan. Mod. of Elasticity (kg/cm$^2$ × 10$^3$) |
|---|---|---|---|---|---|---|---|---|
| 19 | 636.8 | 471.0 | 14.7 | 30 | 6.12 | 7.80 | 0.69 | 20.60 |
| 20 | 505.5 | 424.7 | 14 | 70 | 5.34 | 9.52 | 1.07 | 16.38 |
| 21 | 410.0 | 433.9 | 12.6 | 119 | 5.13 | 16.64 | 1.60 | 13.71 |

These data illustrate that as the oxazolidone content of the composition increased, the tensile strength at yield and break, the percent elongation at yield, the elastic modulus, and the tangent modulus of elasticity increase while the percent elongation at break, tensile impact and Izod impact decrease.

EXAMPLE 23 (5462-28)

The thermal stability of the products prepared in Examples 19-21 was determined by heating an accurately weighed sample at 300° C. in air for 30 minutes and measuring the resulting weight loss. Two controls were also used:

TABLE I

| Example | Wt. Loss (%) | Mole % Oxazolidone |
|---|---|---|
| 19 | 18 | 23 |
| 20 | 19 | 12 |
| 21 | 23 | 6 |
| Control* | 26 | 0 |
| Control** | 7.3 | 100 |

*The polyol from Example 2 (116 gm; 0.79 mole of OH) was mixed with 1.2 gm. of a 0.1% solution of dibutyltindilaurate in the polyol and degassed. To this mixture was added with rapid stirring 112 gm. (0.81 mole of-NCO) of ISONATE 191 diisocyonate. Vaccuum was applied. The mixture exothermed to 75° C., and a plaque was cast as in Example 21.
**A mixture of 38 gm. of the diglycidyl ether of bisphenol A (EPON 828 brand), 28 gm. of ISONATE 191 diisocyanate, and 0.3 gm. of ADOGEN 464 brand catalyst were heated at 100° C. for about three hours to give a brittle solid which was found by IR analysis to contain essentially 100 mole % oxazolidone.

As shown in Table I, as the oxazolidone content of the polymer mixture increases, less material is lost due to thermal degradation.

The Examples which are contained herein illustrate certain embodiments of the invention but should not be construed in a limiting sense. The scope of protection sought is set forth in the claims which follow.

What is claimed is:

1. A process for the preparation of thermoset compositions containing oxazolidone linkages in the polymer backbone separated from one another by ester groups and urethane linkages in side chains to the polymer backbone which comprises reacting a polyisocyanate and a prepolymer, derived from reaction of a diepoxide and acid, containing at least one terminal epoxy group and at least one non-terminal, secondary hydroxy group, the molar amounts of epoxy and hydroxy in the prepolymer being equal, to thereby form the thermoset.

2. A process of claim 1 wherein the prepolymer is formed by reaction of a diepoxide with an acid selected from the group consisting of monocarboxylic acids and dicarboxylic acids.

3. A process as claimed in claim 2 wherein the diepoxide is selected from the group consisting of the diglycidyl ethers of dihydric mononuclear and fused ring phenols, the diglycidyl ethers of non-fused polynuclear phenols, the diglycidyl ethers of novolac resins, dicyclopentadiene dioxide, vinyl cyclohexane dioxide, the dicylcohexyl oxide carboxylates, and the diglycidyl derivatives of aromatic primary amines.

4. A process as claimed in claim 2 wherein the monocarboxylic acid is selected from the group consisting of the saturated monocarboxylic acids and the unsaturated monocarboxylic acids.

5. A process as claimed in claim 2 wherein the dicarboxylic acid is selected from the group consisting of phthalic acid, isophthalic acid, terephthalic acid, adipic acid, oxalic acid, and succinic acid.

6. A process as claimed in claim 1 wherein the polyisocyanate is selected from the group consisting of the aromatic polyisocyanates and the aliphatic polyisocyanates.

7. A process as claimed in any of claims 2-6 wherein the diepoxide is present at slightly more than two moles to every mole of acid.

8. A process as claimed in any of claims 1-6 wherein the prepolymer has the formula $$R \underbrace{\left[ \begin{array}{c} CH-R_1-CH-CH-R_2 \\ | \phantom{xx} \diagdown \phantom{x} / \\ OH \phantom{xxx} O \end{array} \right]}_{x}$$

where R, R$_1$ and R$_2$ are independently any grouping of atoms to which a carbon atom can be covalently linked and x is an integer and is either 1 or 2.

9. A process as claimed in any of claims 1-6 which further comprises the presence of an isocyanate reactive compound selected from the group consisting of hydroxy compounds and epoxy compounds.

10. A process as claimed in any of claims 1-6 which further comprises a catalytically effective amount of a catalyst selected from the group consisting of catalysts which favor urethane group formation and catalysts which favor oxazolidone group formation.

11. A thermoset composition containing oxazolidone and urethane linkages which is substantially free of isocyanurate linkages, said oxazolidone linkages being present in the polymer backbone and separated from one another by ester linkages derived from an acid, said urethane linkages being present in a side chain attached to the polymer backbone.

12. A composition as claimed in claim 11 wherein the molar amount of oxazolidone to urethane ranges from about 90:10 to 4:96.

13. A composition as claimed in claim 11 which further comprises at least one reinforcing agent.

14. A composition as contained in claim 11 wherein the recurring unit has the formula:

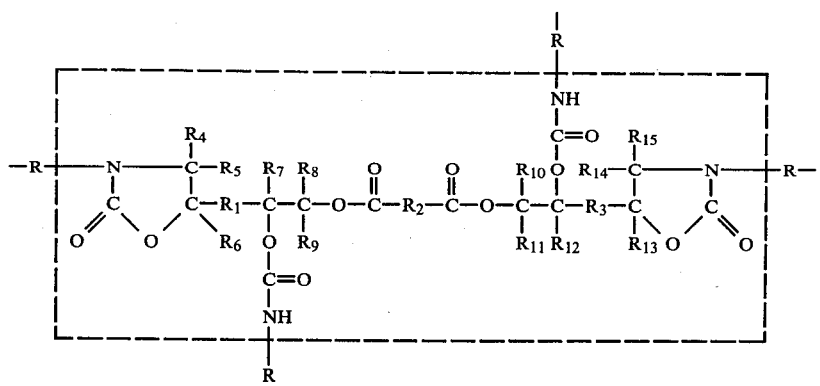
wherein R, $R_1$, $R_2$ and $R_3$ are a grouping to which carbon atoms can be covalently linked and $R_4$–$R_{13}$ are independently the same and also include hydrogen.
15. A composition as claimed in any of claims 11-14 formed in a reaction injection molding process.
* * * * *

UNITED STATES PATENT AND TRADEMARK OFFICE
CERTIFICATE OF CORRECTION

PATENT NO. : 4,424,316
DATED : January 3, 1984
INVENTOR(S) : Anthony L. DiSalvo, Arthur J. Yu It is certified that error appears in the above—identified patent and that said Letters Patent is hereby corrected as shown below:

Col. 4, line 60,   "of" after "90:10" should be -- to --;

Col. 6, line 28,   "mixtures" before "was heated" should be -- mixture --;

Col. 6, line 53,   "contiunued" should be -- continued --;

Col. 9, line 46,   "degased" should be -- degassed --;

Col. 9, line 59,   "oxaxolidone" should be -- oxazolidone --;

Col. 11, line 23,  "degased" should be -- degassed --; and

Col. 11, line 48,  "depoxide" should be --diepoxide --.

Signed and Sealed this

Eighth Day of January 1985

[SEAL]

Attest:

GERALD J. MOSSINGHOFF

Attesting Officer

Commissioner of Patents and Trademarks